US009888381B2

(12) United States Patent
Kang et al.

(10) Patent No.: US 9,888,381 B2
(45) Date of Patent: Feb. 6, 2018

(54) METHOD OF CONTROLLING ELECTRONIC DEVICE, ELECTRONIC DEVICE, METHOD OF CONTROLLING ACCESS POINT AND ACCESS POINT

(71) Applicant: SAMSUNG ELECTRONICS CO., LTD., Suwon-si (KR)

(72) Inventors: Hyun-koo Kang, Yongin-si (KR); Jun-Seok Kang, Incheon (KR); Kyung-ik Cho, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 191 days.

(21) Appl. No.: 14/755,661

(22) Filed: Jun. 30, 2015

(65) Prior Publication Data
US 2015/0382194 A1 Dec. 31, 2015

(30) Foreign Application Priority Data
Jun. 30, 2014 (KR) .................. 10-2014-0080976

(51) Int. Cl.
| | | |
|---|---|---|
| H04W 4/00 | (2009.01) |
| H04W 12/06 | (2009.01) |
| H04W 36/14 | (2009.01) |
| H04W 76/02 | (2009.01) |
| H04W 76/06 | (2009.01) |

(Continued)

(52) U.S. Cl.
CPC ............ *H04W 12/06* (2013.01); *H04L 63/18* (2013.01); *H04W 36/14* (2013.01); *H04W 76/02* (2013.01); *H04W 76/06* (2013.01); *H04W 48/20* (2013.01); *H04W 84/12* (2013.01); *H04W 88/08* (2013.01)

(58) Field of Classification Search
None
See application file for complete search history.

(56) References Cited

U.S. PATENT DOCUMENTS

2004/0229606 A1  11/2004  Oshima et al.
2007/0036358 A1   2/2007  Nguyen et al.
(Continued)

FOREIGN PATENT DOCUMENTS

CN   103781098 A    5/2014
EP     2903324 A1    8/2015
(Continued)

OTHER PUBLICATIONS

Communication dated Oct. 20, 2015, issued by the International Searching Authority in counterpart International Application No. PCT/KR2015/006551 (PCT/ISA/210 & PCT/ISA/237).
(Continued)

Primary Examiner — Phirin Sam
(74) Attorney, Agent, or Firm — Sughrue Mion, PLLC

(57) ABSTRACT

An electronic device includes a network interface configured to communicate with an access point via a Local Area Network (LAN) cable, a wireless network interface configured to wirelessly communicate with the access point, and a controller configured to detect a connection to the access point via the LAN cable, control the network interface to receive access information for establishing a wireless connection with the access point from the access point, and control the wireless network interface to wirelessly connect to the access point using the received access information.

21 Claims, 12 Drawing Sheets

(51) Int. Cl.
*H04L 29/06* (2006.01)
*H04W 84/12* (2009.01)
*H04W 88/08* (2009.01)
*H04W 48/20* (2009.01)

(56) References Cited

U.S. PATENT DOCUMENTS

| | | |
|---|---|---|
| 2009/0103547 A1 | 4/2009 | Lam et al. |
| 2009/0128634 A1 | 5/2009 | Miura et al. |
| 2011/0167461 A1* | 7/2011 | Maruyama .......... H04L 12/2836 725/81 |
| 2012/0106527 A1* | 5/2012 | Ichikawa .............. H04W 24/02 370/338 |
| 2013/0016708 A1* | 1/2013 | Haba .................... H04W 48/16 370/338 |
| 2014/0029749 A1 | 1/2014 | Malasani |
| 2014/0181500 A1* | 6/2014 | Mann .................... G06F 9/4401 713/2 |
| 2015/0280978 A1 | 10/2015 | Ye et al. |
| 2017/0039630 A1* | 2/2017 | Daigle .................... H04L 63/08 |

FOREIGN PATENT DOCUMENTS

| | | |
|---|---|---|
| JP | 2005150794 A | 6/2005 |
| JP | 2007020037 A | 1/2007 |
| JP | 2012010140 A | 1/2012 |
| JP | 2012-109944 A | 6/2012 |

OTHER PUBLICATIONS

Communication dated Nov. 20, 2015, issued by the European Patent Office in counterpart European Application No. 15173974.5.

* cited by examiner

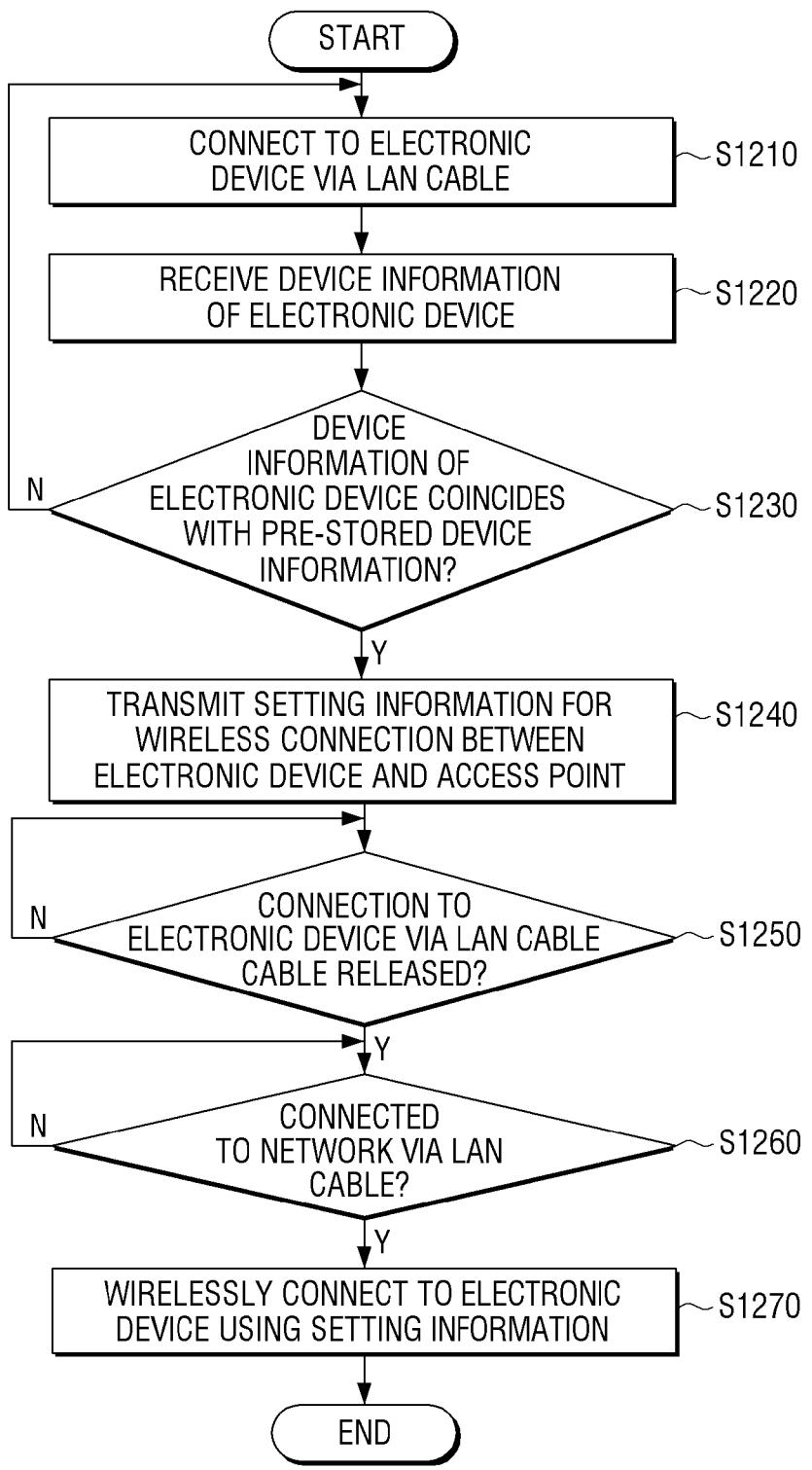

METHOD OF CONTROLLING ELECTRONIC DEVICE, ELECTRONIC DEVICE, METHOD OF CONTROLLING ACCESS POINT AND ACCESS POINT

CROSS-REFERENCE TO RELATED APPLICATION

This application claims priority from Korean Patent Application No. 10-2014-0080976, filed in the Korean Intellectual Property Office on Jun. 30, 2014, the disclosure of which is incorporated herein by reference in its entirety.

BACKGROUND

1. Field

Apparatuses and methods consistent with exemplary embodiments relate to a method of controlling an electronic device for wireless connection between the electronic device and the access point.

2. Description of the Related Art

A Wireless Local Area Network (WLAN) is a local area network environment without connection via a cable. A variety of electronic devices capable of wireless local area network communication are wirelessly connected to the Internet and provide a variety of services through the wireless connection.

Electronic devices may be connected to the Internet through a wireless communication device called an access point (AP), rather than being directly connected to the Internet. That is, the access point may be connected to the Internet with a wire and wirelessly connected to the electronic devices so that the electronic devices may wirelessly use the Internet service through connection with the access point.

As such, the electronic device and the access point need to be wirelessly connected, and with regard to a pairing between the electronic device and the access point, various methods may be used including a Service Set Identifier (SSID) and password method, a Push Button Configuration (PBC) method, a Personal Identifier Number (PIN) method, a Near Field Connection (NFC) method, etc.

However, the above methods may be either inconvenient or cause security issues. For example, for the SSID and password method or the PIN method, it may be cumbersome to remember the information and input the information through a number of user operations, and there may also be security issues since the password or the PIN number may be exposed to another person. In addition, the PBC method may be vulnerable to malicious hacking by another person.

Also, it is common for an administrative user, when installing the access point to use the WLAN, to fail to modify default values of the access point, but retains default settings that are set by a telecommunication provider providing the access point.

In some cases, the telecommunication provider sets the default values of the access point with limited options in order to fulfill criteria of a corresponding communication provider. For example, the telecommunication provider may limit a number of electronic devices that can connect to the access point, or set the default values such that a connection with another electronic device is not allowed, and set the default values such that only the Internet is allowed, etc. Thus, the user may be precluded from using all of the features included in the access point, and in response to connecting other electronic devices with the access point, the user may find that a particular connection is unavailable, or that a very complicated setup must be performed.

In addition, in a situation in which the user configures values of the access point, it may be cumbersome if a technical term is unfamiliar, or a complicated setup process is required.

Accordingly, when connecting the electronic device and the access point wirelessly or setting the access point, a simple technique is required so that the user is not inconvenienced and does not encounter security problems.

SUMMARY

An aspect of one or more exemplary embodiments relates to a method of controlling electronic devices and controlling an access point such that a user inconvenience and security problems are reduced when wirelessly connecting an electronic device and an access point, and setting up the access point and network.

According to an exemplary embodiment, there is provided a method for controlling an electronic device, the method including: detecting a connection to an access point via a Local Area Network (LAN) cable; receiving access information of a wireless connection between the electronic device and the access point from the access point via the LAN cable; and wirelessly connecting to the access point using the received access information.

Here, the access information may include at least one of a Service Set Identifier (SSID), a password, a Personal Identifier Number (PIN), and a Media Access Control (MAC) address of the access point.

In addition, the access information includes device information of the access point. The method may further include: determining that the received device information matches pre-stored device information; and receiving the access information in response to the determining.

The wirelessly connecting may include: detecting release of connection to the access point via the LAN cable; and wirelessly connecting to the access point using the received access information in response to detecting the release.

The method may further include: displaying a Graphical User Interface (GUI) for changing the access information; in response to the access information being changed on the GUI according to a user input, providing the changed access information to the access point via the LAN cable; and wirelessly connecting to the access point using the changed access information.

The method may further include: receiving network status information from the access point via the LAN cable; displaying a GUI for changing a network setting based on the received network status information; and in response to the network status information being changed on the GUI according to a user input, providing the changed network status information to the access point via the LAN cable.

The method may further include displaying a guide message on the GUI indicating that the network status information has been changed.

The network status information may include subnet status information of a network to which the access point is connected.

The access point may be wirelessly connected to a plurality of electronic devices, and together the access point and the plurality of electronic devices may form a subnet.

According to an exemplary embodiment, there is provided an electronic device including: a network interface configured to communicate with an access point via a Local Area Network (LAN) cable; a wireless network interface configured to wirelessly communicate with the access point; and a controller configured to, detect a connection to the access point via the LAN cable, control the network interface to receive access information for establishing a wireless connection with the access point from the access point, and control the wireless network interface to wirelessly connect with the access point by using the received access information.

The access information may include at least one of a Service Set Identifier (SSID), a password, a Personal Identifier Number (PIN), and a Media Access Control (MAC) address of the access point.

The electronic device may further include: a memory configured to store device information of the access point. The access information may include device information of the access point the controller is further configured to determine that device information stored in the memory matches the received device information, and control the network interface to receive the access information.

The controller may be further configured to: detect release of a connection with the access point via the LAN cable; and control the wireless network interface to wirelessly connect to the access point using the received access information in response to detecting the release.

The electronic device may further include: an input interface configured to receive an input of a user input; and a display configured to display a Graphical User Interface (GUI). The controller may be further configured to display a GUI for changing the access information, and in response to the access information being changed on the GUI according to a user input, control the network interface to provide the changed access information to the access point, and control the wireless network interface to wirelessly connect to the access point using the changed access information.

The controller may be further configured to display a GUI indicating a guide message indicating that the access information has been changed, and display a guide message to remove the LAN cable.

The controller may be further configured to: control the network interface to receive network status information from the access point; display a GUI for changing a network setting based on the received network status information; and in response to the network status information being changed on the GUI according to a user input, control the network interface to provide the changed network status information to the access point.

The network status information may include subnet status information of a network to which the access point is connected.

The access point may be wirelessly connected to a plurality of electronic devices and together the access point and the plurality of electronic devices may form a subnet.

According to an exemplary embodiment, there is provided a method for controlling an access point, the method including: detecting a connection of an electronic device via a Local Area Network (LAN) cable; receiving device information of the electronic device from the electronic device via the LAN cable; determining that the received device information matches pre-stored device information; providing access information for a wireless connection between the electronic device and the access point to the electronic device via the LAN cable; and wirelessly connecting to the electronic device.

The method may further include: receiving changed access information from the electronic device via the LAN cable; and wirelessly connecting to the electronic device using the changed access information.

The method may further include: providing network status information to the electronic device via the LAN cable; receiving changed network status information from the electronic device via the LAN cable; and changing a network setting by using the changed network status information.

According to an exemplary embodiment, there is provided an access point comprising: a network interface configured to communicate with an electronic device via a Local Area Network (LAN) cable; a wireless network interface configured to wirelessly communicate with the electronic device; a memory configured to store device information of the electronic device; and a controller configured to: detect a connection of the electronic device via the LAN cable; control the network interface to receive device information of the electronic device from the electronic device; determine that the received device information matches the device information stored in the memory; provide access information for a wireless connection between the electronic device and the access point to the electronic device; and control the wireless network interface to wirelessly connect to the electronic device.

The controller may be further configured to, in response to changed access information being received from the electronic device via the LAN cable, control the wireless network interface to wirelessly connect to the electronic device using the changed access information.

The controller may be further configured to control the network interface to provide network status information to the electronic device via the LAN cable, and in response to changed network status information being received via the network interface, change a network setting by using the changed network status information.

According to an exemplary embodiment, there is provided a method of establishing a wireless network connection to an access point, the method including: detecting a wired connection of a network device to the access point; providing wireless authentication information to the network device over the wired connection; receiving a request to wirelessly connect to a wireless interface of the access point from the network device, the request comprising the wireless authentication information; authenticating the network device using the wireless authentication information; and establishing the wireless network connection between the access point and the authenticated network device.

BRIEF DESCRIPTION OF THE DRAWINGS

The above and/or other aspects of the present disclosure should be more apparent with the below description of one or more exemplary embodiments of inventive concepts, with reference to the accompanying drawings, in which:

FIG. 12 is a flowchart illustrating a method for controlling an access point according to an exemplary embodiment.

DETAILED DESCRIPTION

One or more exemplary embodiments will now be described with reference to accompanying drawings and detailed description.

Although the terms including an ordinal number such as first, second, etc., can be used for describing various elements, the structural elements are not restricted by the terms. The terms are only used to distinguish one element from another element. For example, without departing from the scope of the present disclosure, a first structural element may be named a second structural element. Similarly, the second structural element also may be named the first structural element. As used herein, the term "and/or" includes any and all combinations of one or more associated items.

Expressions such as "at least one of," when preceding a list of elements, modify the entire list of elements and do not modify the individual elements of the list.

The terms used in this application are for the purpose of describing exemplary embodiments only and are not intended to limit inventive concepts. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Figure 1:
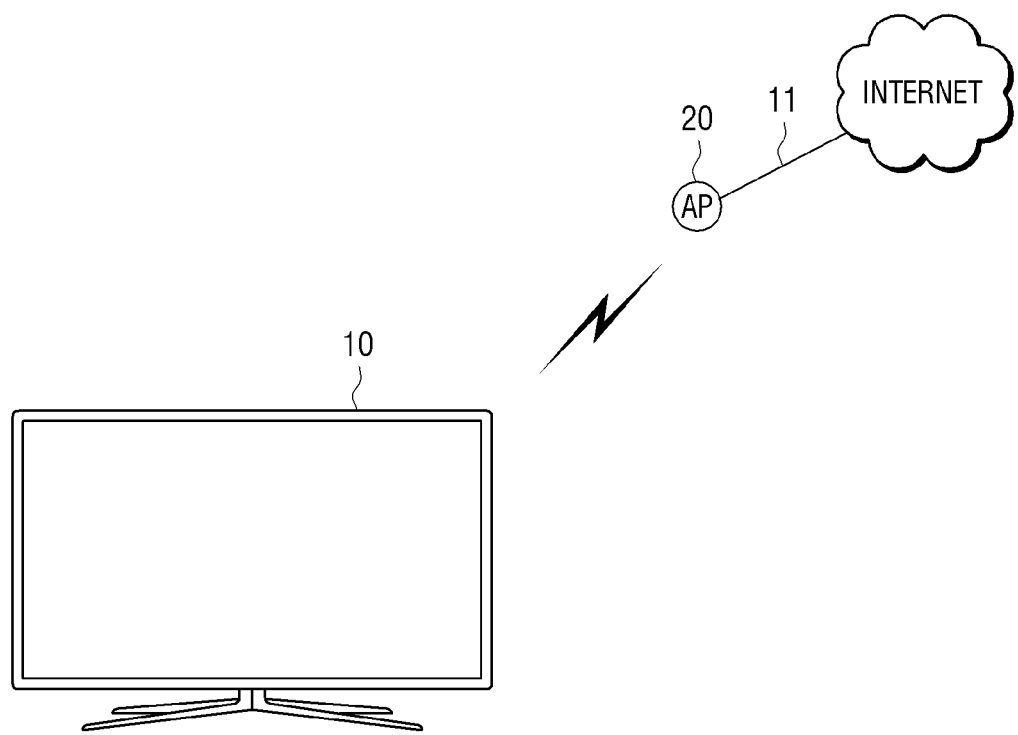
FIG. 1 is a view illustrating a connection between an electronic device and an access point.

FIG. 1 is a view illustrating a method in which an electronic device and an access point are wirelessly connected. As illustrated in FIG. 1, an electronic device 10 in which WLAN communication is available may be wirelessly connected to the Internet and may use a variety of services. Here, an access point 20 is wirelessly connected to the electronic device 10, wherein the access point 20 is connected with the Internet via a LAN cable 11, enabling the electronic device 10 to access the Internet.

The electronic device 10 and the access point 20 are wirelessly connected to each other, and thus, it is important that the target of connection is distinguished and the security maintained. For example, various methods wherein the electronic device 10 and the access point 20 are wirelessly connected may be used, including a Service Set Identifier (SSID)/password method, a Push Button Configuration (PBC) method, a Personal Identifier Number (PIN) method, and a method using a Near Field Communication (NFC) tag or reader, etc.

For example, in the case of the SSID/password method, it is necessary that a user of the electronic device 10 remembers and inputs a SSID and password of an access point to be connected so that the electronic device 10 and the access point 20 may be wirelessly connected. That is, the electronic device 10 should go through a process of remembering and inputting a SSID and password of an access point 20 to be connected to and then it should only be able to wirelessly connect to the access point 20. As for the PIN method, normally the device goes through a process of directly inputting a PIN number of the electronic device 10 to the access point 20. The processes which ought to be taken to connect the electronic device 10 and the access point 20 may not only be cumbersome to a user, but also may pose a security problem of unauthorized use of a password or a PIN number by another person.

As for the PBC method, the user goes through a process of pressing a Wi-Fi Protected Setup (WPS) mounted in the electronic device 10 within a predetermined time after pressing a WPS button of the access point 20, and thus, it is not necessary to perform a process of inputting a number, etc. However, it is inconvenient to require that the button be pressed within a predetermined time, and in a case where a WPS button of another electronic device is pressed by another person within the predetermined time, an access to the access point 20 by another electronic device is allowed. Thus, the system is vulnerable to security breaches. In addition, access points 20 may be of various types including a case in which no WPS button is mounted therein, and in such a case, the PBC connection method is unavailable.

It should be understood that the above-described problems which may occur with related methods are those which may be generated in the step previous to the step in which the electronic device 10 and the access point 20 are wirelessly connected to begin communication, e.g., pairing between the two devices.

Meanwhile, even if the electronic device 10 and the access point 20 are paired up and wirelessly connected as above, in the case in which it is necessary to change a setting of the access point 20, the process may be so complicated and cumbersome that it may be very difficult for a user to directly change the setting.

For example, if the number of electronic devices which may be connected to the access point 20 is set to one, and the user is not able to wirelessly connect a new electronic device to the access point 20, the user should change a set value with respect to the number of electronic devices connectable to the access point 20. In addition, if the user desires to change a SSID and password of the access point 20 for security purposes or a subnet setting in a household, etc., it is necessary to change a set value of the access point 20, as well.

In this case, the access point 20 should be connected to a laptop notebook or desktop PC via a LAN cable, and the user should change a set value individually. However, such process is difficult and very cumbersome for a normal user.

Hereinafter, exemplary embodiments for solving the above-mentioned drawbacks of related methods will be described with reference to FIGS. 2A to 12.

Figure 2A:
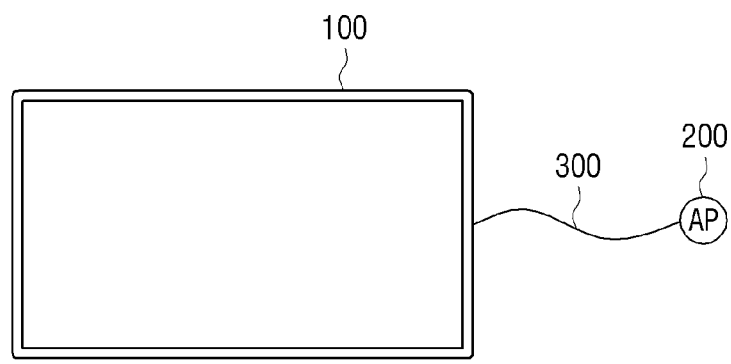
FIGS. 2A and 2B are views illustrating a process in which electronic device and an access point are wirelessly connected according to an exemplary embodiment.
Figure 2B:
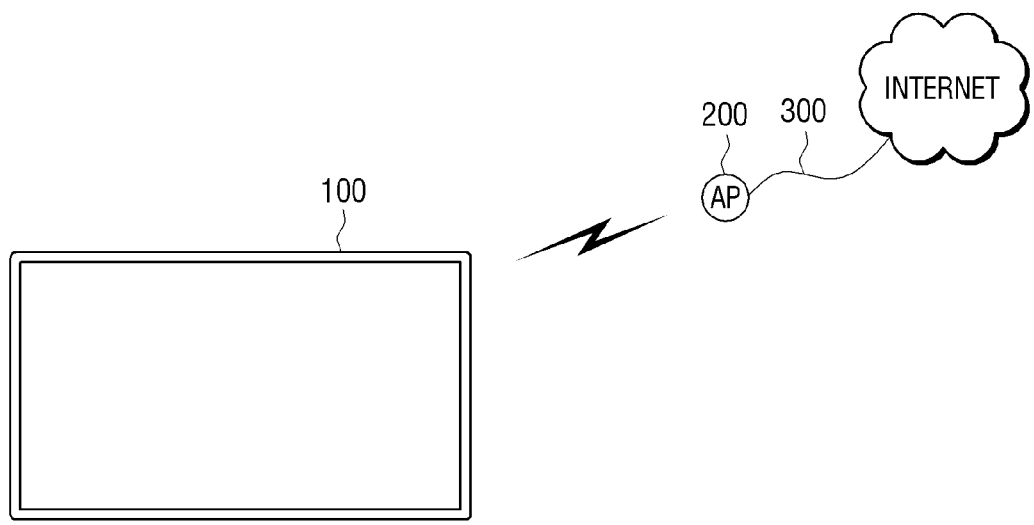

FIGS. 2A and 2B are views illustrating a process in which an electronic device is wirelessly connected to an access point according to an exemplary embodiment. FIGS. 2A and 2B illustrate a case in which an electronic device 100 is a TV; however, it is not limited thereto. Any device capable of communicating with an external network or a device via a LAN cable, and equipped with a configuration capable of wirelessly communicating with an access point 200, may be used as the electronic device 100, such as various home appliances including a washing machine, a refrigerator, mobile devices including a cell phone, audio devices including a room speaker, and display devices including a notebook, PC, electronic frame, smart TV, etc.

As illustrated in FIG. 2A, in response to the electronic device 100 being connected to the access point 200 via a LAN cable 300, the electronic device 100 is configured to receive setting information for wireless connection between the electronic device 100 and the access point 200 from the access point 200 via the connected LAN cable 300. Here, the setting information that the electronic device 100 receives from the access point may include at least one of a Service Set Identifier (SSID), a password, a Personal Identifier Number (PIN), and a Media Access Control (MAC) address of the access point 200.

Also in FIG. 2A, the electronic device 100 may be configured to, in response to being connected to the access point 200 via the LAN cable 300, receive device information of the access point 200 via the LAN cable 300, and in response to the received device information coinciding with (e.g., matching) pre-stored device information, the electronic device may receive setting information from the access point 200 via the LAN cable 300 for a wireless connection between the electronic device 100 and the access point 200.

Subsequently, as illustrated in FIG. 2B, the electronic device 100 is configured to connect to the access point 200 by using the received setting information. Specifically, in response to the setting information for a wireless connection of the electronic device 100 and the access point 200 followed by a connection between the electronic device 100 and the access point 200 via the LAN cable being released, and as illustrated in FIG. 2B, the access point 200 being connected to the Internet via the LAN cable, the electronic device 100 may wirelessly connect to the access point 200 automatically by using the received setting information.

Also, the electronic device 100 may, in response to setting information for a wireless connection being received, display a GUI for changing the received setting information, under the condition illustrated in FIG. 2A. In addition, in response to setting information being changed, according to a user command (e.g., user input), on a GUI capable of changing setting information, the electronic device 100 may transmit the changed setting information to the access point 200 via the LAN cable 300.

Subsequently, as illustrated in FIG. 2B, in response to a connection between the electronic device 100 and the access point 200 via a LAN cable being released, and the access point 200 being connected to the Internet via the LAN cable 300, the electronic device 100 may wirelessly connect to the access point 200 by using the changed setting information.

Meanwhile, the electronic device 100 may, under the condition illustrated in FIG. 2A, receive network status information from the access point 200 via the LAN cable 300, and display a GUI for changing a network setting based on the received network status information. Here, the network status information may include subnet status information of a network to which the access point 200 is connected.

Accordingly, in response to network status information being changed on a GUI for changing a network setting, the electronic device 100 may transmit the changed network status information to the access point 200 via the LAN cable 300.

Figure 3:
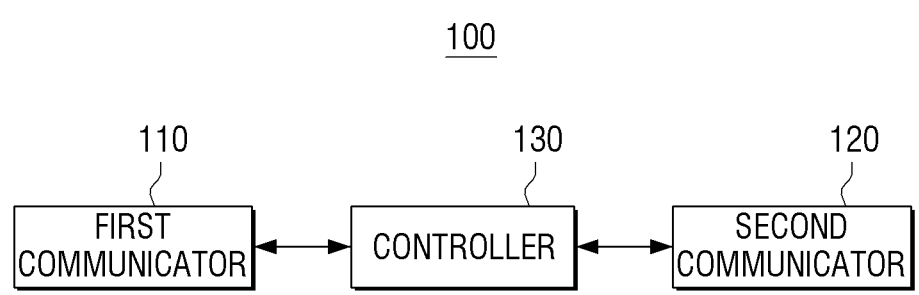
FIG. 3 is a block diagram illustrating a configuration of an electronic device according to an exemplary embodiment.

Hereinafter, a feature and an operation of the electronic device 100 according to an exemplary embodiment will be described in more detail with reference to a block diagram of FIG. 3. According to FIG. 3, the electronic device 100 includes a first communicator 110, a second communicator 120 and a controller 130.

The first communicator 110 may be connected to the Internet or an external device via the LAN cable 300, in order to communicate with an external server or external device. In particular, the first communicator 110 may be connected to the access point 200 via a LAN cable to communicate with each other. For example, the first communicator 110 may be configured to include an RJ45 port; however, it is not limited thereto. However, it may be configured with anything such that it is capable of being connected to the access point 200 via the LAN cable to communicate with each other.

A second communicator 120 may wirelessly communicate with an external device. In particular, the second communicator 120 may communicate with an outside access point 200 using a Wireless LAN method. For example, the second communicator 120 may be configured to include a Wireless LAN card; however, it is not limited thereto.

A controller 130 is configured to control the overall operations of the electronic device 100. In particular, the controller 130 may, in response to the electronic device 100 being connected to the access point 200 via the LAN cable 300, control the first communicator 110 to receive setting information from the access point 200 for a wireless connection with the access point 200.

Specifically, the controller 130 may, in response to a LAN cable being connected to the first communicator 110, detect the connection and determine whether the cable is connected to the Internet or to the access point 200. In response to determining that the cable is connected to the access point 200, the controller 130 may control the first communicator 110 to receive setting information for a wireless connection from the access point 200.

Here, the setting information for a wireless connection between the electronic device 100 and the access point may include at least one of a Service Set Identifier (SSID), a password, a Personal Identifier Number (PIN), and a Media Access Control (MAC) address of the access point 200.

The controller 130 may control the second communicator 120 to wirelessly connect to the access point 200 by using the received setting information. Specifically, the controller 130 may, in response to the setting information for a wireless connection between the electronic device 100 and the access point 200 being received from the access point 200, followed by a connection to the access point 200 via the LAN cable 300 being released in the first communicator 110, detect the release.

Subsequently, in response to the access point 200 being connected to the Internet via the LAN cable 300 and being prepared to provide a Wireless LAN service to the electronic device 100, the controller 130 may control the second communicator 120 to wirelessly connect to the access point 200 automatically by using the received setting information.

For example, the controller 130 may retrieve an access point near the controller, select the access point 200 corresponding to SSID of the access point received via the LAN cable 300 among the retrieved access points, transmit a received password, and transmit the received password and be wirelessly connected to the access point 200. In addition, the controller 130 may be wirelessly connected to the corresponding access point 200 by using the received PIN number or MAC address of the access point 200, for example.

As such, the electronic device 100 and the access point 200 are connected to each other via the LAN cable 300 to exchange setting information for wireless connection between the two devices such as a SSID, a password, a PIN number, a MAC address, etc. Therefore, a device to be wirelessly connected may be identified securely and safely without a possibility of setting information being exposed to another person, and the electronic device 100 may wirelessly connect to the access point 200 by using the received setting information.

Figure 4:
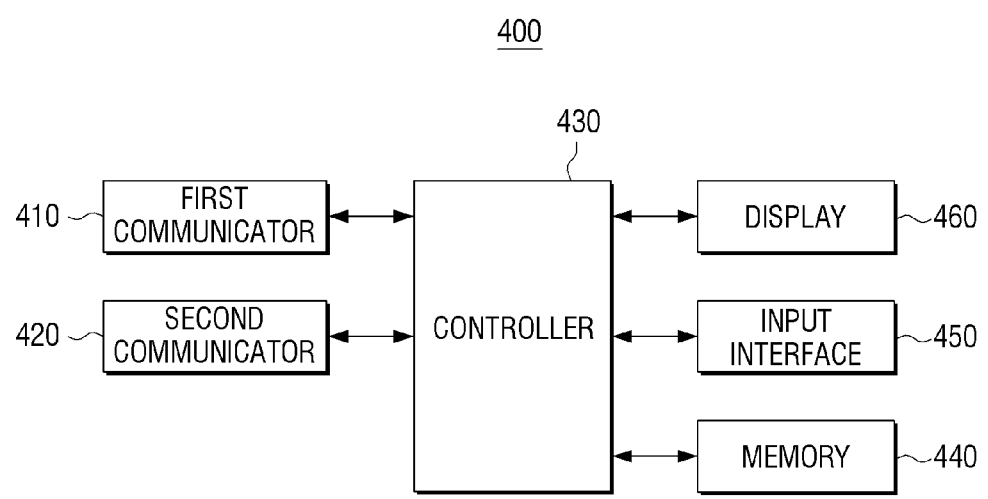
FIG. 4 is a block diagram illustrating a configuration of an electronic device according to another exemplary embodiment.

Hereinafter, a feature and an operation of the electronic device according to another exemplary embodiment will be described with reference to FIGS. 4-8. FIG. 4 is a block diagram illustrating a configuration of the electronic device according to another exemplary embodiment. According to FIG. 4, an electronic device 400 includes a first communicator 410, a second communicator 420, a controller 430, a storage 440 (e.g., memory), an input interface 450 and a display 460.

Meanwhile, features and operations of the first communicator 410, the second communicator 420 and the controller 430 of the electronic device 400 according to an exemplary embodiment of FIG. 4 may include those of the first communicator 110, the second communicator 120 and the controller 130, respectively. Accordingly, the electronic device 400 of FIG. 4 will be described, and s any descriptions that overlap with the electronic device 100 according to an example of FIG. 3 may be omitted.

The storage 440 is configured to store various programs and data required for driving and operating the electronic device 400. In particular, the storage 440 may store device information of the access point 200. Here, the device information of the access point 200 may include information about the manufacturer of the access point 200, and the serial number of the access point 200, etc. In addition, the storage 440 may store setting information for a wireless connection, network status information, connection history information with the access point 200 received from the access point 200, etc. For example, the storage 440 may be realized as a hard disk drive (HDD), Random-access memory (RAM), etc.; however, it is not limited thereto.

The input interface 450 may receive input by various user commands to control the electronic device 100. For example, the input interface 450 may be realized using at least one of a keyboard, a mouse, a soft keyboard, a button, a touch pad, a remote controller, etc., according to a type of the electronic device 400.

The display 460 is configured to display an image. Specifically, the display 460 may be controlled by the controller 430 to display a guide message regarding a connection between the electronic device 400 and the access point 200, and various GUIs. In particular, the display 460 may be controlled by the controller 430 to display a GUI for changing setting information for a wireless connection with the access point 200, and a GUI for changing a network setting.

For example, the display 460 may be realized in various forms according to a type of the electronic device 400. For example, the display 460 may be realized to include at least one of a Cathode Ray Tube (CRT), a Liquid Crystal Display Panel (LCD), Organic Light Emitting Diodes (OLED), a Plasma Display Panel (PDP), Light Emitting Diodes (LED), etc.; however, it is not limited thereto.

The controller 430 is configured to control the overall operations of the electronic device 400. In particular, the controller 430 may, in response to being connected to the access point 200 via a LAN cable, receive setting information of the access point from the access point 200, and in response to the received setting information coinciding with device information stored in the storage 440, control the first communicator 410 to receive setting information from the access point 200 for wireless connection between the electronic device 400 and the access point 200.

Specifically, the controller 430 may, in response to a LAN cable connected to an access point 200 being connected to the first communicator 410, detect the connection and determine whether the connection via the LAN cable is with the access point 200 or the Internet. Specifically, the controller 410 may determine whether a signal transmitted to the first communicator 410 via a LAN cable is an Internet connection signal or a signal by a protocol predetermined with the access point 200, and determine whether the device connected to the first communicator 410 is the access point 200.

For example, the controller 430 may, in response to being connected to the access point via a LAN cable, control the first communicator 410 to receive device information including a manufacturer of the access point 200 and a serial number of the device from the access point 200. In response to the received device information coinciding with device information stored in the storage 440, the controller may determine that it is the access point 200 which is currently connected via the LAN cable, and not the Internet. Accordingly, in response to determining that it is being connected to the access point 200 via the LAN cable, the controller 430 may control the first communicator 410 to receive setting information for wireless connection with the access point 200.

In addition, as described above, the device information of the access point 200 may include information about the manufacturer. In response to the device connected to the first communicator 410 via the LAN cable being the access point 200 manufactured by a specific manufacturer, the controller 430 may control the first communicator 410 to receive setting information for a wireless connection from the access point 200.

Meanwhile, according to an exemplary embodiment, the controller 430 may control the first communicator 410 to transmit setting information of the electronic device 400 required for wireless connection with the access point 200 to the access point 200. Here, the setting information of the electronic device 400 required for wireless connection with the access point 400 may include at least one of device information of the electronic device 400 including information about a manufacturer of the electronic device 400 and a serial number of the electronic device 400, and a PIN number and MAC address of the electronic device 400.

In addition, the controller 430 may control the second communicator 420 to wirelessly connect to the access point 200 by using the setting information received from the access point 200 via the LAN cable. Specifically, in response to a connection of the first communicator 410 to the access point 200 via a LAN cable being released, the controller 430 may detect the released connection. Subsequently, in response to the access point 200 being connected to the Internet via a LAN cable and being able to provide the Wireless LAN service to the electronic device 400, the controller 430 may retrieve access points nearby, and control the second communicator 420 to wirelessly connect to the access point 200 corresponding to the setting information among the retrieved access points by using setting information received through the first communicator 410.

Figure 5:
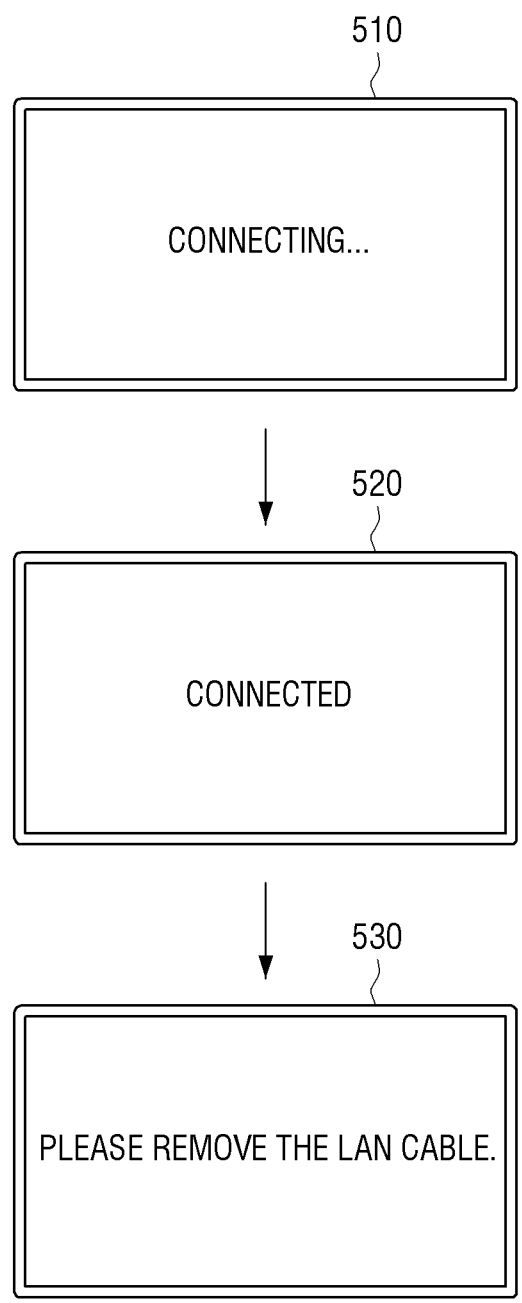
FIG. 5 is a view illustrating a guide message displayed on an electronic device according to an exemplary embodiment.

Here, the controller 430 may control the display 460 to display a guide message regarding a connection between the electronic device 400 and the access point 200. FIG. 5 is a view illustrating an exemplary embodiment of a guide message regarding a connection with an access point 200 displayed on the display 460.

The controller 430 may, in response to a LAN cable to which the access point 200 is connected being connected to the first communicator 410, detect the connected LAN cable, and exchange various information with the access point 200 through the first communicator 410. For example, the controller 410 may receive device information of the access point 200 and setting information for a wireless connection from the access point 200, and control the first communicator 410 to transmit information about the electronic device 400 required for wireless connection to the access point 200 according to an exemplary embodiment.

Here, the controller 430 may, as in Reference Numeral 510 in FIG. 5, control the display 460 to display a guide message indicating that the electronic device 400 and the access point 200 are, at the moment, exchanging the above-described various information (e.g., connecting).

In addition, in response to the above-described information exchange with the access point 200 via the LAN cable being complete, the controller 430 may control the display 460 to display a guide message indicating that the connection is complete as in Reference Numeral 520 in FIG. 5 (e.g., connected), and subsequently display a message guiding a user to remove the LAN cable from the electronic device 400 as in Reference Numeral 530 in FIG. 5 to wirelessly connect to the access point 200 based on information received or transmitted by the electronic device 400.

However, FIG. 5 merely illustrates an example, and it should be understood that a message regarding connection between the electronic device 400 and the access point 200 is not limited thereto. For example, the controller 430 may control the display 460 to display a guide message such as "Please remove the LAN cable for wireless connection," unlike Reference Numeral 530 in FIG. 5.

Meanwhile, the controller 430 may control the display 460 to display a GUI for changing setting information for a wireless connection between the electronic device 400 and the access point received from the access point 200 via a LAN cable. In addition, the controller 430 may, in response to setting information being changed on a GUI according to a user command received through the input interface 450, control the first communicator 410 to transmit the changed setting information to the access point 200, and control the second communicator 420 to wirelessly connect to the access point 200 by using the changed setting information. Here, the GUI for changing setting information may be in the form of a pop-up message or an On-Screen Display (OSD), etc., however, it is not limited thereto. Meanwhile, the reasons for changing setting information varies, but one reason may be for security benefits.

Hereinafter, the controller 430 displaying a GUI for changing setting information, and in response to the setting information being changed on the GUI, wirelessly connecting to the access point 200 by using the changed setting information, will be described with reference to FIG. 6.

Specifically, the controller 430 may, in response to the first communicator 410 being connected to the access point 200 via a LAN cable, receive setting information from the access point 200, and display a GUI for changing setting information including the received setting information on the display 460.

Figure 6:
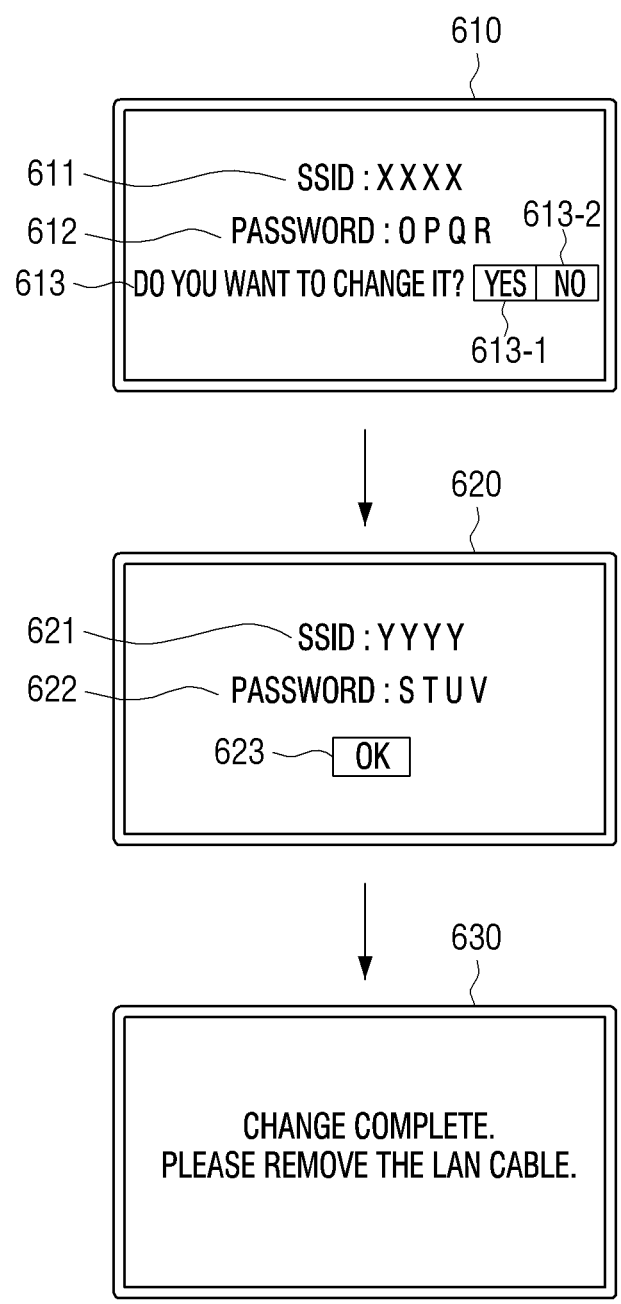
FIG. 6 is a view illustrating a GUI for changing setting information displayed in an electronic device according to an exemplary embodiment.

According to Reference Numeral 610 in FIG. 6, it may be understood that the setting information received from the access point 200 includes a SSID 611 and password 612 of the access point 200. That is, the controller 430 may, in response to the SSID 611 of the access point XXXX, with password 612 OPQR being received from the access point 200 connected to the first communicator 410 via a LAN cable, control the display 460 to display the received setting information 611, 612 and a message 613, 613-1, 613-2 asking whether a user desires to change the information.

Here, in response to the user selecting a YES 613-1 on the displayed GUI through the input interface 450, the controller 430 may display a GUI screen to which the user may input a new SSID and password. Reference Numeral 620 in FIG. 6 illustrates that on the GUI for changing setting information, the SSID 621 of the access point 200 is changed to YYYY, and the password 622 is changed to STUV according to the user command received through the input interface 450. In response to the user selecting an OK 623 button, the controller 430 may control the first communicator 410 to transmit the SSID and password of the access point changed by the user to the access point 200 via a LAN cable. As such, the access point 200 which received the changed setting information is configured to change its own setting information according to the received setting information.

In addition, the controller 430 may control the display 460 to display a message to guide that the setting information has been changed, and a guide message to remove the LAN cable.

Accordingly, in response to the user removing the LAN cable from the electronic device 400 and the LAN cable being disconnected from the first communicator 410, the controller 410 may detect the disconnected cable. Subsequently, in response to the access point 200 being connected to the Internet via a LAN cable and being able to provide the Wireless LAN service, control the second communicator 420 to retrieve access points near the controller 430, and control the second communicator 420 to wirelessly connect to the access point 200 corresponding to the changed setting information among the retrieved access points. That is, wirelessly connect to the access point 200 of which SSID is YYYY and access password is STUV.

According to an exemplary embodiment above, the SSID and password of the access point 200 are changed through the GUI and the access point 200 wirelessly connects using the changed SSID and password. However, the setting information of the access point 200 is not limited to the SSID and password, and thus, according to an exemplary embodiment, in which the electronic device 400 and the access point 200 are connected via a LAN cable, according to an exemplary embodiment, a GUI for changing setting information of various access points such as a PIN number or a MAC address of the access point and the number of electronic devices accessible to the access point, etc., may be displayed on the display 460. Also, it may be changed according to a user command.

Meanwhile, the controller 430 may, in response to being connected to the access point 200 via a LAN cable, control the first communicator 410 to receive network status information from the access point 200, and display a GUI for changing a network setting based on the received network status information. In addition, the controller 430 may, in response to network status information being changed on a GUI for changing network setting information according to a received user command, control the first communicator 410 to transmit the changed network status information to the access point 200 via the LAN cable.

Hereinafter, with reference to FIGS. 7 and 8, a changing of setting of a network through the electronic device 400 according to an exemplary embodiment will be described as an example.

Figure 7:
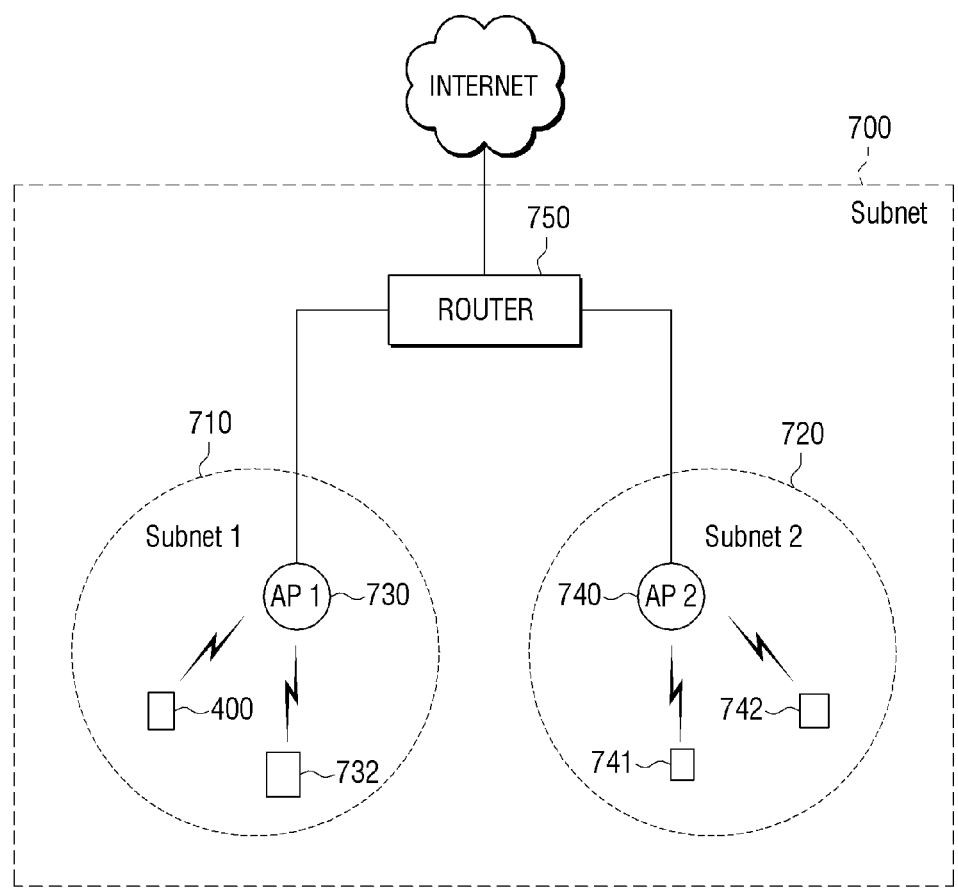
FIG. 7 is a view illustrating a changing of a network setting according to an exemplary embodiment.

FIG. 7 illustrates a structure of a network within a household. According to FIG. 7, an Access Point 1 (AP 1) 730 and electronic devices 400 and 732 wirelessly connected to AP 1 constitute a subnet named Subnet 1 (710); an Access Point 2 (AP 2) 740 and electronic devices 741 and 742 wirelessly connected to AP 2 constitute a subnet named Subnet 2 (720); and Subnet 700, which includes Subnet 1 (710) and Subnet 2 (720), is connected to access points 730 and 740 via a ROUTER 750 to constitute an upper subnet of Subnet 1 (710) and Subnet 2 (720).

The electronic device 400 of FIG. 7 may be connected to the other electronic device 732 of the Subnet 1 (710), which is a subnet to which it belongs, to exchange information. However, the electronic device 400 and the electronic devices 741 and 742 belonging to the other subnet, Subnet 2 (720), are different in terms of the subnet they belong to, even when connected via the ROUTER 750. Thus, they may not be connected to communicate with each other.

That is, for example, in one of two rooms of a house, a user may wirelessly connect a notebook computer 400 via the Access Point 1 (730), and listen to the desired music by streaming it on the Internet. Under these circumstances, it is impossible for a user to (even if desired by the user) play music through a room speaker 741 wirelessly connected to the access point 2 (740) in the other room, since the subnets to which the access point 1 (730) and the access point 2 (740) respectively belong are different.

In order to make it possible, a user must connect a notebook computer or a PC to access point 730 or 740, and go through a complicated process to change a setting of the subnet, which is very difficult cumbersome work.

Accordingly, an electronic device 400 according to an exemplary embodiment is configured to, when connected to the access point 730 via a LAN cable to receive setting information for a wireless connection, receive network status information from the access point 730 along with the setting information, and display a GUI for changing a network setting based on the received network status information to enable the user to easily change the network setting information.

Specifically, according to an example of FIG. 7, in response to the first communicator 410 and the Access Point 1 (730) being connected via a LAN cable, the controller 430 may detect the connected cable, and control the first communicator 410 to receive network status information from the Access Point 1 (730). Here, the network status information is the information on setting status of a network to which the Access Point 1 (730) is connected, and it may include information about a subnet.

That is, in an example of FIG. 7, the Access Point 1 (730) may, while storing information on a subnet constituted of Subnet 1 (710), the subnet to which it belongs, Subnet 2 (720), the other subnet, and subnet 700 including Subnet 1 (710) and Subnet 2 (720), in response to the electronic device 400 and the Access Point 1 (730) being connected to each other via the LAN cable, transmit the network status information to the electronic device 400 via the first communicator 410, wherein the controller 430 of the electronic device 400 may control the first communicator 410 to receive the received network status information.

Accordingly, the controller 430 may display a GUI for changing network setting information based on the received network status information, and in response to the network status information being changed on the displayed GUI according to a received user command, control the first communicator 410 to transmit the changed network status information to the Access Point 1 (730).

Figure 8:
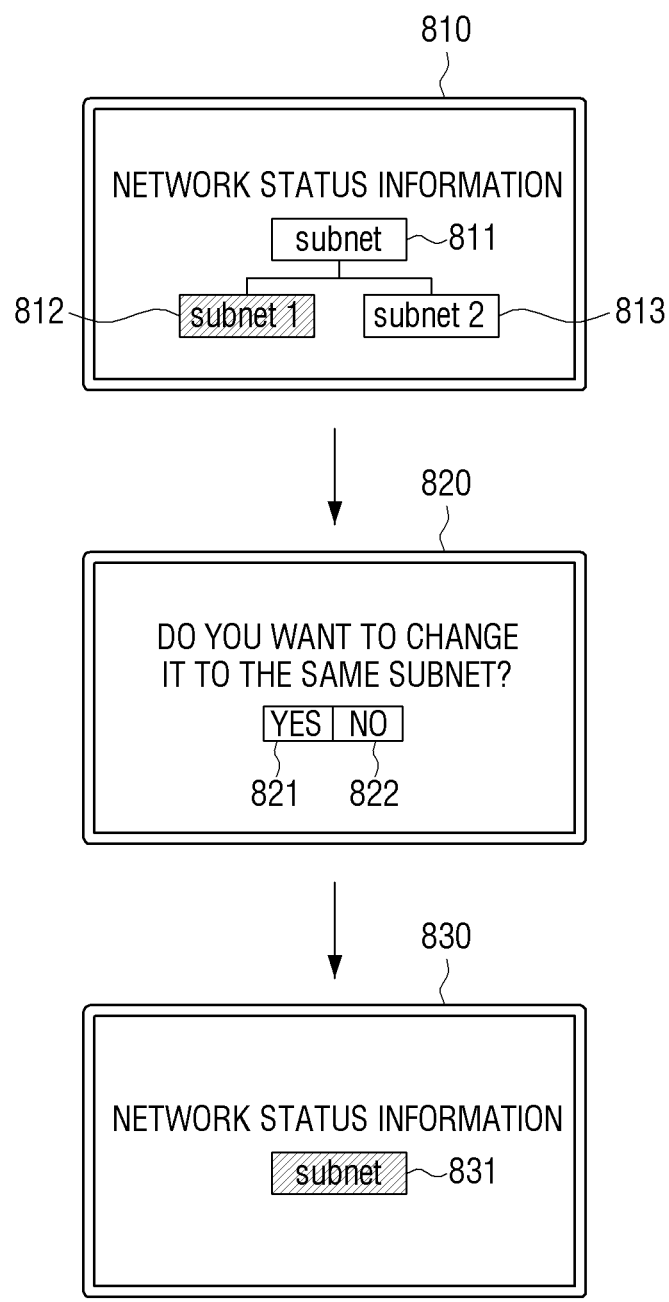
FIG. 8 is a view illustrating a GUI for changing a network setting displayed in an electronic device according to an exemplary embodiment.

FIG. 8 is a view illustrating an example in which the system has a network status as illustrated in FIG. 7, the electronic device 400 is connected to the Access Point 1 (730) via a LAN cable, and a GUI for changing network setting is displayed.

The controller 430 may, in response to network status information being received from the access point 730 via a LAN cable, display the received network status as illustrated in Reference Numeral 810. That is, it should be understood that a current network has a Subnet 811, a Subnet 1 (812) and a Subnet 2 (813) set as illustrated in Reference Numeral 810, and that the current electronic device 400 is included in the Subnet 1 812.

Subsequently, the controller 430 may display a message such as "Do you want to change it to the same subnet?" as illustrated in Reference Numeral 820 in order to change network setting according to a user command. Accordingly, in response to the user selecting a YES 821 on the displayed GUI through the input interface 450, the controller 430 may control the first communicator 410 to change Subnet 1 and Subnet 2 to a single same subnet, the Subnet, and transmit the changed network status information to the access point 730 via the LAN cable.

Here, the controller 430 may, as in Reference Numeral 830, display a message to inform a user that all subnets within the network are changed to a single same subnet, Subnet 831.

Meanwhile, the access point 730 which received changed network status information from the electronic device 400 may, by using the received network status information, change the subnet names, Subnet 1 and Subnet 2, to the Subnet, a name of the upper subnet, and automatically change a network setting.

Meanwhile, if the user selects a No 822 through the input interface 450 as in Reference Numeral 820, the controller 430 does not transmit the network status information to the access point, or display a message as in the Reference Numeral 830. Accordingly, a setting of the network remains unchanged.

As such, the electronic device 400 may be connected to the access point 200 via a LAN cable to receive network status information from the access point 200, display a GUI for changing a network setting based on the received network status information, and in response to network status information being changed on the displayed GUI, transmit the changed network status information to the access point 200 via the LAN cable and change a setting of network. Thus, the user may easily change the network setting through the electronic device 400 without going through a complicated process.

Meanwhile, in an example of FIG. 8, displaying a GUI for changing network setting, and in response to network status information being changed on the displayed GUI, transmitting the changed network status information to an access point to change the network setting is described as an example, however, an exemplary embodiment is not limited thereto.

For example, in response to the access point 400 and the first communicator 410 being connected via a LAN cable, the controller 430 may receive device information from the access point 200 via the LAN cable. In response to the received device information of the access point 200 and information stored in the storage 440 coinciding, the controller may not display the GUI for changing a network setting, and may automatically transmit network status information to change all subnets to the same subnet to the access point via the LAN cable, thus allowing the access point to change the network setting information. That is, according to an exemplary embodiment, in response to determining that the electronic device 400 manufactured by a specific manufacturer and the access point 200 are connected via the LAN cable, automatically changing all the networks to the same subnet.

In addition, according to an exemplary embodiment illustrated in FIGS. 7 and 8, a subnet setting is described as an example of the network setting, however, the network setting is not limited thereto. Anything related to a network setting may be included in the GUI for network settings, and the user of the electronic device 400 may be able to change network status information on the GUI displayed on the display 460 in order to change the setting of network.

Meanwhile, the storage 440 may store information about a history of the previous connections to the access point 200. Here, the information history of the connections to the access point 200 may include device information of the access point 200 wirelessly connected to the electronic device 400, and setting information for a wireless connection.

According to another exemplary embodiment, the controller 430 may, in response to the first communicator 410 and the access point 200 being connected via a LAN cable, control the first communicator 410 to detect the connected cable and receive device information from the access point 200 via the LAN cable, compare the received device information of the access point 200 with connection history information stored in the storage 440, and only in response to having no connection history information, receive setting information for a wireless connection from the access point 200.

In this case, according to an exemplary embodiment, in response to having information about a history of connection with the access point 200 connected via a LAN cable, the controller 430 may be configured to control the second communicator 420 to not receive the setting information for a wireless connection from the access point, and to wirelessly connect to the access point 200 by using setting information for wireless connection included in information about a history of connection with the corresponding access point 200 stored in the storage 440.

Figure 9:
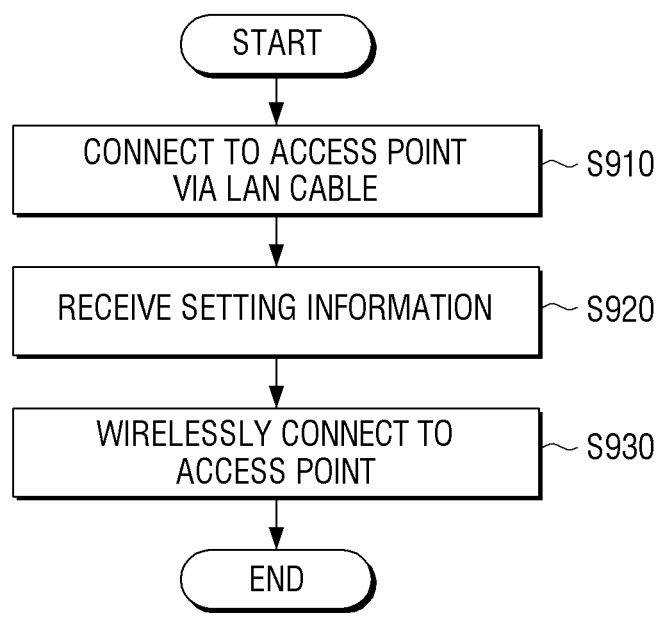
FIG. 9 is a flowchart illustrating a method for controlling an electronic device according to an exemplary embodiment.

FIG. 9 is a flowchart illustrating a method for controlling an electronic device according to an exemplary embodiment. According to FIG. 9, the electronic device 100 is configured to, in response to being connected to the access point 200 via a LAN cable (S910), receive setting information for a wireless connection between the electronic device 100 and the access point 200 from the access point 200 via the LAN cable (S920).

Here, the setting information may include at least one of a Service Set Identifier (SSID), a password, a Personal Identifier Number (PIN), and a Media Access Control (MAC) address of the access point.

In addition, the electronic device 100 may wirelessly connect to the access point 200 by using the received setting information (S930). Specifically, in response to the connection to the access point 100 via the LAN cable being released, and then the access point 200 being connected to the Internet via a LAN cable and being prepared to provide the Wireless LAN service, the electronic device 100 may retrieve access points nearby, and wirelessly connect to the access point 200 by using the received setting information.

Figure 10:
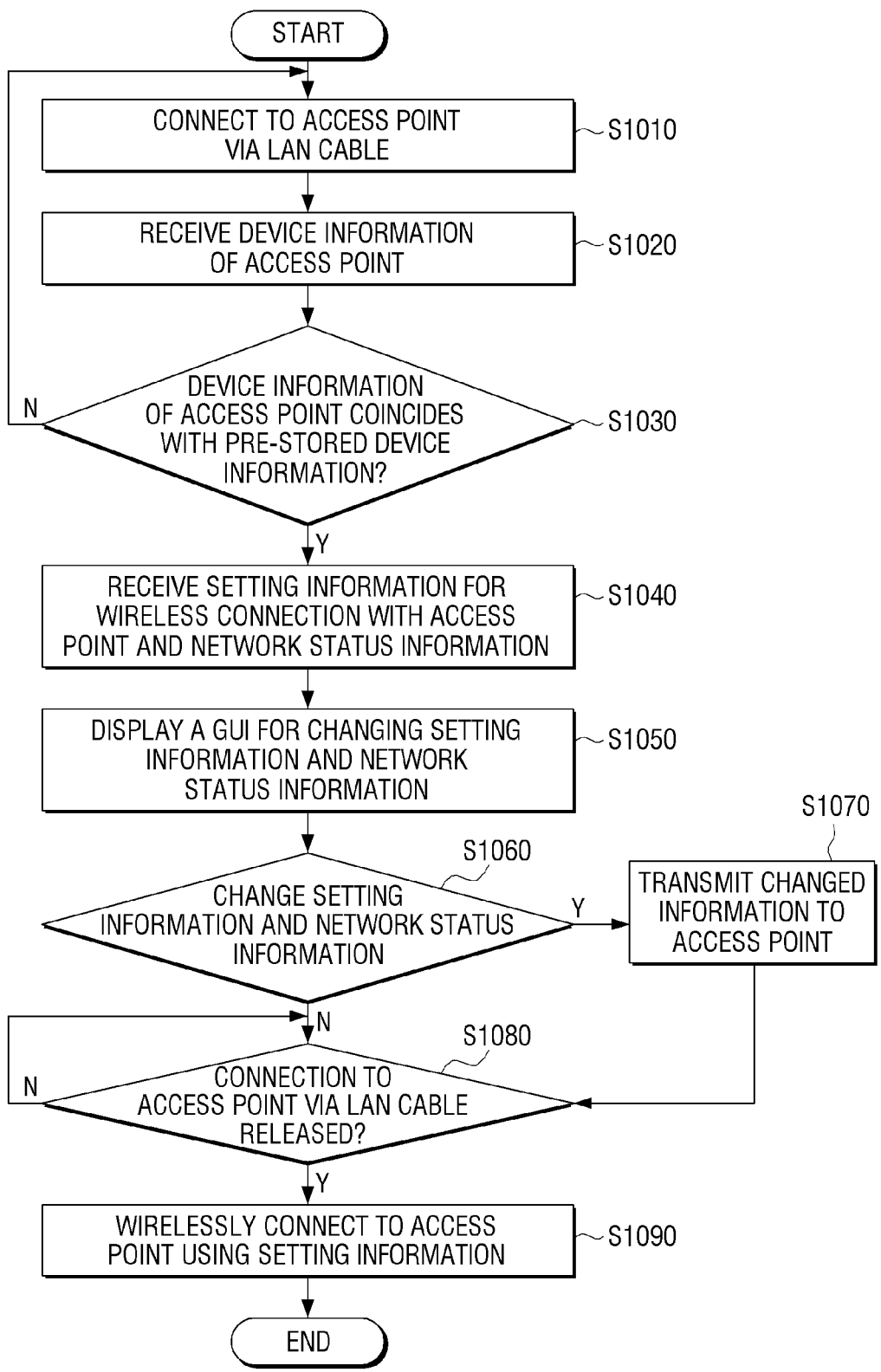
FIG. 10 is a flowchart illustrating a method for controlling an electronic device according to another exemplary embodiment.

FIG. 10 is a flowchart illustrating a method for controlling the electronic device according to another exemplary embodiment. According to FIG. 10, the electronic device 400 may, in response to being connected to the access point 200 via a LAN cable (S1010), receive device information of the access point 200 from the access point 200 via the LAN cable (S1020). Here, the device information of the access point 200 may include at least one of information about a manufacturer of the access point 200, and serial information of the access point 200.

Accordingly, in response to the device information of the access point 200 coinciding with pre-stored device information (S1030—Y), the electronic device 400 may receive setting information for wireless connection with the access point 200 and network status information from the access point 200 via the LAN cable (S1040). On the other hand, in response to the device information of the access point 200 and the pre-stored device information failing to coincide, the electronic device 400 does not receive the setting information or the network status information from the access point (S1030—N).

Subsequently, the electronic device 400 is configured to display a GUI for changing setting information and network status information based on the received setting information and network status information (S1050), and in response to the setting information being changed on the displayed GUI (S1060—Y), transmit the changed setting information to the access point 200 (S1070). The access point 200 that received the changed setting information is configured to change its own setting information according to the received setting information. Accordingly, in response to the connection to the access point 200 via the LAN cable being released (S1080—Y), the electronic device 400 is configured to wirelessly connect to the access point 200 by using the changed setting information (S1090).

Meanwhile, in response to the setting information not being changed on the displayed GUI (S1060—N), the electronic device 400 is configured to wait (S1080—N) until the connection to the access point 200 via the LAN cable is released (S1080—Y), to wirelessly connect to the access point by using the setting information received via the LAN cable (S1090).

Meanwhile, a changing of network status information is irrelevant as to whether to use the received setting information or the changed setting information while the electronic device 400 is wirelessly connected to the access point 200 in step S1090. However, the electronic device 400 is configured to, in response to network status information being changed on the displayed GUI (S1060—Y), transmit the changed network status information to the access point 200 (S1070). The access point 200 that received the changed network status information is configured to change network settings according to the changed network status information.

Figure 11:
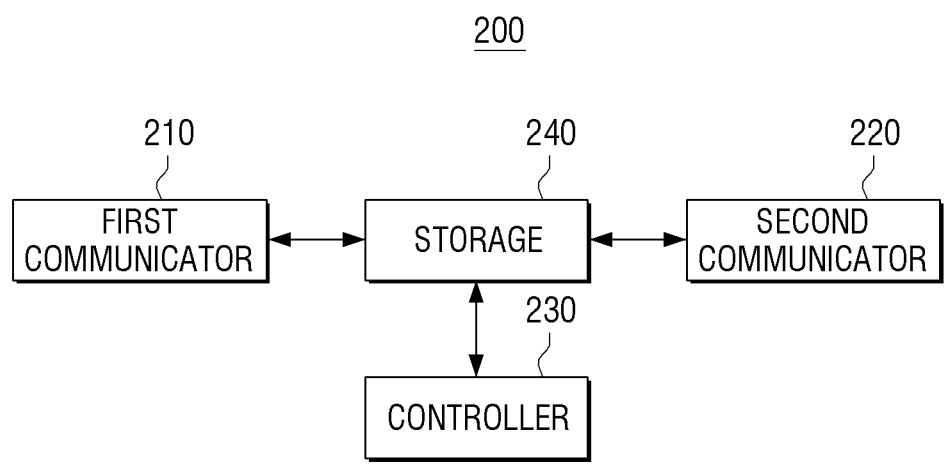
FIG. 11 is a block diagram illustrating a configuration of an access point according to an exemplary embodiment.

FIG. 11 is a block diagram illustrating a configuration of the access point according to an exemplary embodiment. According to FIG. 11, the access point 200 includes a first communicator 210, a second communicator 220, a controller 230, and a storage 240.

The first communicator 210 may be connected to the Internet or an external device via a LAN cable, and communicate with the connected device. In particular, the first communicator 210 may be connected to the electronic devices 100 and 400 via the LAN cable in order to directly communicate with the devices, and also may be connected to various networks including the Internet in order to communicate with an external server or external device. For example, the first communicator 210 may be configured to include an RJ45 port; however, it is not limited thereto. It also may be configured such that it is connectable to the electronic devices 100 and 400 and a network to communicate with one another.

The second communicator 220 may wirelessly communicate with an external device. For example, the second communicator 220 may communicate with the electronic devices 100 and 400 using the Wireless LAN method.

Meanwhile, the detailed configuration of the first communicator 210 and the second communicator 220 may be the same as that of an exemplary access point, described above. Thus, a more detailed description will be omitted herein.

The storage 240 may be configured to store various programs and data for operating the access point 200. In particular, the storage 240 may store device information of the electronic devices 100 and 400 that are to be connected to the access point 200, and setting information of a network to which the access point 200 is connected.

Here, the device information of the electronic devices 100 and 400 may include at least one of information about a manufacturer of the electronic devices 100 and 400, and serial numbers of the electronic devices 100 and 400. In addition, the setting information of the network may include subnet setting information of a network to which the access point 200 is connected. However, the device information and network setting information of the electronic devices 100 and 400 are not limited thereto.

The controller 230 is configured to control overall operations of the access point 200. In particular, the controller 230 may control the first communicator 210 to, in response to being connected to the electronic devices 100 and 400 via a LAN cable, receive device information of the devices from the electronic devices 100 and 400, and in response to the received device information coinciding with device information stored in the storage 240, transmit setting information for wireless connection between the electronic devices 100 and 400 and the access point to the electronic devices 100 and 400.

Specifically, the controller 230 may control the first communicator 210 to, in response to the first communicator and the electronic devices 100 and 400 being connected via a LAN cable, detect the connected cable and receive device information of the devices from the electronic devices 100 and 400.

Accordingly, in response to the device information of the electronic devices 100 and 400 being received, the controller 230 may determine whether the received device information and the device information pre-stored in the storage 240 coincide, and in response to the information coinciding, control the first communicator 210 to transmit setting information of the access point 200 for wireless connection between the electronic devices 100 and 400 and the access point 200 to the electronic devices 100 and 400.

Here, the setting information of the access point 200 for wireless connection between the electronic devices 100 and 400 and the access point 200 may include at least one of a Service Set Identifier (SSID), a password, a Personal Identifier Number (PIN) and a Media Access Control (MAC) address of the access point 200.

Meanwhile, according to an exemplary embodiment, the controller 240 may control the first communicator 210 to receive setting information of the electronic devices 100 and 400 for wireless connection between the electronic devices 100 and 400 and the access point 200 from the electronic devices 100 and 400 via a LAN cable. Here, the setting information of the electronic devices 100 and 400 may include at least one of device information of the electronic device 400, including information about a manufacturer of the electronic devices 100 and 400, and serial numbers of the electronic devices 100 and 400, and a PIN and MAC address of the electronic device 400.

In addition, the controller 230 may, in response to a connection to the electronic devices 100 and 400 via a LAN cable being released and then being connected to a network such as the Internet via the LAN cable, control the second communicator 220 to wirelessly connect to the electronic devices 100 and 400 using the setting information of the access point 200 transmitted to the electronic devices 100 and 400 via the LAN cable or the setting information of the electronic devices 100 and 400 received from the electronic devices 100 and 400.

For example, if the electronic devices 100 and 400 and the access point 200 are to be wirelessly connected using the SSID and password method, the controller 230 may control the first communicator 210 to, in response to being connected to the electronic devices 100 and 400 via the LAN cable, receive device information of the electronic devices 100 and 400 from the electronic devices 100 and 400, and in response to the received device information and the device information stored in the storage 230 coinciding, transmit a SSID and password of the access point 200 to the electronic devices 100 and 400 via the LAN cable.

Subsequently, in response to the connection to the electronic devices 100 and 400 via the LAN cable being released and then being connected to a network via the LAN cable, the controller 230 may periodically transmit a Beacon signal to inform of the existence of the access point 200, and in response to the electronic devices 100 and 400 receiving the signal to transmit the SSID and password in order to connect to the access point 200, receive the SSID and password to control the second communicator 220 to wirelessly connect to the electronic devices 100 and 400.

Meanwhile, the controller 230 may, in response to changed setting information being received from the electronic devices 100 and 400 via a LAN cable, control the second communicator 220 to wirelessly connect to the electronic devices 100 and 400 using the changed setting information.

Specifically, in response to the electronic device 400 and the access point 200 being connected via a LAN cable, and the controller 230 transmitting setting information of the access point 200 to the electronic device 400 through the first communicator 210, the electronic device 400 may receive the setting information and display a GUI for changing the setting information.

Subsequently, in response to setting information being changed on the GUI displayed on the electronic device 400 and the changed setting information being transmitted via the LAN cable, the controller 230 may control the first communicator 210 to receive the changed setting information, change the setting information according to the received setting information, and control the second communicator 220 to wirelessly connect to the electronic device 400 using the changed setting information.

For example, in response to a changed SSID and password being received from the electronic devices 100 and 400 via a LAN cable, the controller 230 may change a SSID and password of the access point 200 according to the received information, and subsequently in response to the changed SSID and password being transmitted from the electronic devices 100 and 400, control the second communicator 220 to receive the changed information to wirelessly connect to the electronic devices 100 and 400.

Above, an exemplary embodiment is described in which the SSID and password method is used. However, it is not limited to this. For example, using a PIN method or a MAC address method, the electronic devices 100 and 400 and the access point 200 may exchange setting information for wireless connection via a LAN cable. Thus, the access point 200 and the electronic devices 100 and 400 are wirelessly connectable using the exchanged setting information.

Meanwhile, the controller 230 may control the first communicator 210 to transmit network status information stored in the storage 240 via a LAN cable, and in response to the changed network status information being received through the first communicator 210, the controller 230 may change a setting of a network to which the access point 200 is connected using the changed network status information.

Specifically, in response to being connected to the electronic device 400 via a LAN cable, the controller 230 may be configured to transmit network status information stored in the storage 240 to the electronic device 400. The electronic device 400 may be configured to display a GUI for changing a network setting based on the received network status information, and in response to network status information being changed on the GUI, transmit the changed network status information via the LAN cable. Accordingly, the controller 230 is configured to control the first communicator 210 to receive the changed network status information.

Subsequently, the controller 230 may, in response to the connection to the electronic device 400 via the LAN cable being released and being connected to a network via a LAN cable, change a setting of a network using the changed network status information.

For example, in a case in which the network status information is information about a subnet setting of a network as illustrated in FIG. 7, in response to the access point 200 being connected to a network via a LAN cable, the controller 230 is configured to receive subnet setting information of the connected network and store the received subnet setting information in the storage 240. Subsequently, in response to being connected to the electronic device 400 via the LAN cable, the controller 230 may control the first communicator 210 to transmit network status information on the subnet setting of a network stored in the storage 240 to the electronic device 400 via the LAN cable.

Accordingly, the electronic device 400 that received the network status information is configured to display a GUI for changing a network setting based on the received network status information, and in response to network status information being changed on the displayed GUI to change all subnet settings of the network to the same settings, and the changed network status information being transmitted via the LAN cable, the controller 230 may control the first communicator 210 to receive the changed network status information.

Subsequently, the controller 230 may, in response to the connection to the electronic device 400 via the LAN cable being released and being connected to a network via a LAN cable, change all subnet settings of the network to the same settings by using the changed network status information received via the LAN cable.

Meanwhile, changed network status information includes information about a network setting to be changed, and thus, the controller 230 may change the network setting using the changed network status information. For example, in related art, it used to be necessary that an access point be connected to a notebook computer and then five steps of manual operations be performed. In response to a changed network status information is a changing of the subnet setting, the controller 230 would have been able to sequentially carry out the five steps of operations to automatically change the subnet setting. However, this is merely an example, and the disclosure is not limited to a method for changing network setting by using changed network status information.

FIG. 12 is a flowchart illustrating a method for controlling an access point according to an exemplary embodiment. According to FIG. 12, in response to the access point 200 being connected to the electronic devices 100 and 400 via a LAN cable (S1210), the access point 200 may receive device information of the electronic devices 100 and 400 from the electronic devices 100 and 400 via the LAN cable (S1220).

In response to the received device information of the electronic devices 100 and 400 coinciding with pre-stored device information of the electronic devices 100 and 400 (S1230_Y), the access point 200 may transmit setting information for wireless connection between the electronic devices 100 and 400 and the access point 200 to the electronic devices 100 and 400 via the LAN cable (S1240).

Subsequently, the access point 200 may wait (S1250—N) on the connection to the electronic devices 100 and 400 via the LAN cable being released (S1250—Y), and then wait (S1260—N) to connect to a network via a LAN cable (S1260—Y), and wirelessly connect to the electronic devices using the setting information (S1270).

Meanwhile, according to a method for controlling an access point according to another exemplary embodiment, the access point 200 may, in response to receiving changed setting information from the electronic devices 100 and 400 via the LAN cable, wirelessly connect to the electronic devices 100 and 400 according to the changed setting information.

In addition, the access point 200 may transmit pre-stored network status information to the electronic devices 100 and 400 via the LAN cable, and in response to changed setting information being transmitted from the electronic devices 100 and 400, change a setting of a network by using the changed network status information.

Above, the setting information for a wireless connection between the electronic device 400 and the access point 200 is described with a SSID, a password, a PIN, and a MAC address as examples. However, the disclosure is not limited to these examples. Device information of the access point 200 or the electronic device 400 may be used as information for identifying each other between the two devices. Thus, in an exemplary embodiment in which the controller 430 is configured to control the second communicator 420, it is possible to establish a wireless connection between the electronic device 400 and the access point 200 by using device information received from the access point 200 via a LAN cable.

Also, in an exemplary embodiment in which a manufacturer of the electronic device 400 and a manufacturer of the access point 200 exchange device information including information about a manufacturer of each device or identification information of each device and store the device information in each device. Subsequently, in response to the electronic device 400 and the access point 200 being connected via the LAN cable and exchanging device information with each other, the electronic device 400 and the access point 200 may be wirelessly connected using the exchanged information.

According to one or more exemplary embodiments described above, a user may implement a wireless connection between an electronic device and an access point more easily, securely, and safely. Further, a user may implement a setting of the access point and a network more easily.

Also, a method for controlling a display device according to one or more exemplary embodiments may be implemented as a program code and provided as stored in a non-transitory readable medium. An electronic device and access point in which such non-transitory readable medium is mounted may execute the program code to carry out the above-mentioned method for controlling an electronic device and an access point according to various exemplary embodiments.

For example, it may be stored and provided in a non-transitory computer readable medium as a program code for carrying out a controlling method of an electronic device including, in response to being connected to an access point via a LAN cable, receiving setting information for wireless connection between the electronic device and the access point from the access point via the LAN cable, and wirelessly connecting to the access point using the received setting information.

As another example, it may be stored and provided in a non-transitory readable medium as a program code for carrying out a controlling method of an access point including, in response to being connected to an electronic device via a LAN cable, receiving device information of the electronic device from the electronic device via the LAN cable, in response to the received device information coinciding with pre-stored device information, transmitting setting information for wireless connection between the electronic device and an access point via the LAN cable, and in response to the connection to the electronic device via the LAN cable being released, and then connected to a network via a LAN cable, wirelessly connecting to the electronic device using the setting information.

Here, the non-transitory readable medium may refer to a medium which semi-permanently stores data, and is readable by a device. Specifically, it may be a compact disc (CD), a digital video disc (DVD), a hard disk, a Blu-ray Disc, a Universal Serial Bus (USB), a memory card, a read-only memory (ROM), etc.

The foregoing exemplary embodiments and advantages are merely exemplary and are not to be construed as limiting the present disclosure. The inventive concepts can readily be applied to other types of devices. Also, the description of the exemplary embodiments of the inventive concepts is intended to be illustrative, and not to limit the scope of the claims, and many alternatives, modifications, and variations should be apparent to those skilled in the art.

What is claimed is:

1. A method for controlling an electronic device, the method comprising:
   in response to being connected to an access point via a Local Area Network (LAN) cable,
   receiving access information for a wireless connection between the electronic device and the access point from the access point via the LAN cable;
   providing a User Interface (UI) for changing the access information;
   in response to changed access information being input on the UI, providing the changed access information to the access point via the LAN cable; and
   wirelessly connecting to the access point using the changed access information.

2. The method of claim 1, wherein the access information comprises at least one of a Service Set Identifier (SSID), a password, a Personal Identifier Number (PIN), and a Media Access Control (MAC) address of the access point.

3. The method of claim 1, wherein the access information comprises device information of the access point, and wherein the method further comprises:
   determining that the device information matches pre-stored device information; and
   receiving the access information in response to the determining.

4. The method of claim 1, wherein the wirelessly connecting comprises:
   detecting release of connection to the access point via the LAN cable; and
   wirelessly connecting to the access point using the received access information in response to detecting the release.

5. The method of claim 1, further comprising:
   receiving network status information from the access point via the LAN cable;
   displaying a UI for changing a network setting based on the received network status information; and
   in response to the network status information being changed on the UI according to a user input, providing the changed network status information to the access point via the LAN cable.

6. The method of claim 5, further comprising displaying a guide message on the UI indicating that the network status information has been changed.

7. The method of claim 5, wherein the network status information includes subnet status information of a network to which the access point is connected.

8. The method of claim 5, wherein the access point is wirelessly connected to a plurality of electronic devices, and together the access point and the plurality of electronic devices form a subnet.

9. An electronic device, comprising:
   a network interface configured to communicate with an access point via a Local Area Network (LAN) cable;
   a wireless network interface configured to wirelessly communicate with the access point;
   a display; and
   a controller configured to:
      in response to being connected to the access point via the LAN cable,
      control the network interface to receive access information for a wireless connection with the access point from the access point;
      provide a User Interface (UI) for changing the access information on the display,
      provide, in response to changed access information being input on the UI, the changed access information to the access point via the LAN cable; and
      control the wireless network interface to wirelessly connect with the access point by using the changed access information.

10. The electronic device of claim 9, wherein the access information comprises at least one of a Service Set Identifier (SSID), a password, a Personal Identifier Number (PIN), and a Media Access Control (MAC) address of the access point.

11. The electronic device of claim 9, further comprising:
   a memory configured to store device information of the access point,
   wherein the access information comprises device information of the access point the controller is further configured to determine that device information stored in the memory matches the received device information, and control the network interface to receive the access information.

12. The electronic device of claim 9, wherein the controller is further configured to:
   detect release of a connection with the access point via the LAN cable; and
   control the wireless network interface to wirelessly connect to the access point using the received access information in response to detecting the release.

13. The electronic device of claim 9, wherein the controller is further configured to display a UI indicating a guide message indicating that the access information has been changed, and display a guide message to remove the LAN cable.

14. The electronic device of claim 9, wherein the controller is further configured to:
   control the network interface to receive network status information from the access point;
   display a UI for changing a network setting based on the received network status information; and
   in response to the network status information being changed on the UI according to a user input, control the network interface to provide the changed network status information to the access point.

15. The electronic device of claim 14, wherein the network status information includes subnet status information of a network to which the access point is connected.

16. The electronic device of claim 14, wherein the access point is wirelessly connected to a plurality of electronic devices and together the access point and the plurality of electronic devices form a subnet.

17. A method for controlling an access point, the method comprising:
   in response to being connected to an electronic device via a Local Area Network (LAN) cable,
   receiving device information of the electronic device from the electronic device via the LAN cable;
   providing access information for a wireless connection between the electronic device and the access point based on the received device information to the electronic device via the LAN cable; and
   in response to changed access information being received from the electronic device via the LAN cable, wirelessly connecting to the electronic device using the changed access information.

18. The method of claim 17, further comprising:
   providing network status information to the electronic device via the LAN cable;
   receiving changed network status information from the electronic device via the LAN cable; and
   changing a network setting by using the changed network status information.

19. An access point comprising:
   a network interface configured to communicate with an electronic device via a Local Area Network (LAN) cable;
   a wireless network interface configured to wirelessly communicate with the electronic device;
   a memory configured to store device information of the electronic device; and
   a controller configured to:
      in response to being connected to the electronic device via the LAN cable, control the network interface to receive device information of the electronic device from the electronic device;
      provide access information for a wireless connection between the electronic device and the access point based on the received device information to the electronic device; and
      in response to changed access information being received from the electronic device via the LAN cable, control the wireless network interface to wirelessly connect to the electronic device using the changed access information.

20. The access point of claim 19, wherein the controller is further configured to control the network interface to provide network status information to the electronic device via the LAN cable, and in response to changed network status information being received via the network interface, change a network setting by using the changed network status information.

21. A method of establishing a wireless network connection to an access point, the method comprising:
   in response to a wired connection of a network device to the access point being detected,
   providing wireless authentication information to the network device over the wired connection;
   receiving a request to wirelessly connect to a wireless interface of the access point from the network device, the request comprising the wireless authentication information;
   authenticating the network device using the wireless authentication information;
   detecting a release of the wired connection of the network device to the access point; and
   in response to detecting the release, establishing the wireless network connection between the access point and the authenticated network device.

* * * * *